June 15, 1948.  G. F. PINSUTI  2,443,476
MEASURING TAPE
Original Filed May 16, 1939
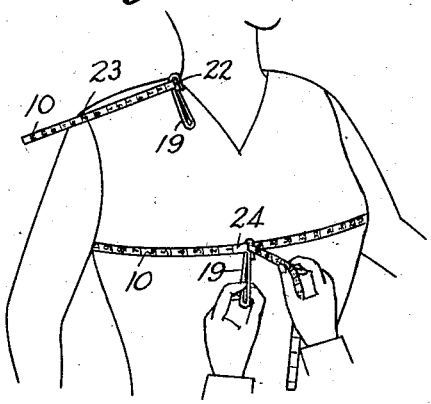
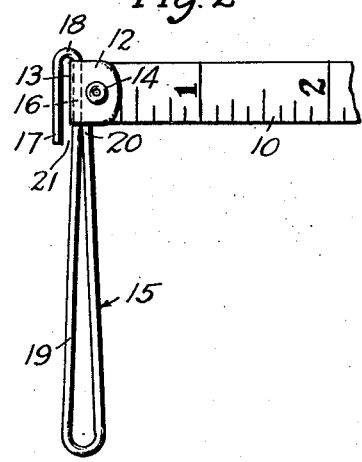
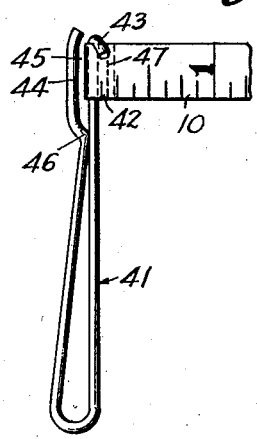
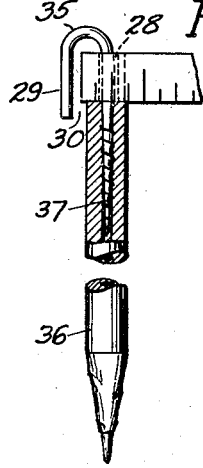
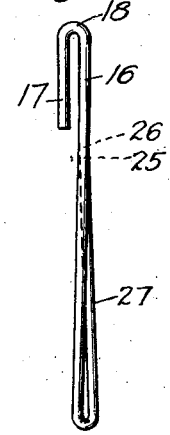
INVENTOR.
Giuseppe F. Pinsuti
BY
*Harry Jacobson*
ATTORNEY Patented June 15, 1948

2,443,476

UNITED STATES PATENT OFFICE 2,443,476

MEASURING TAPE

Giuseppe F. Pinsuti, New York, N. Y.

Refiled for abandoned application Serial No. 273,843, May 16, 1939. This application July 4, 1944, Serial No. 543,456

13 Claims. (Cl. 33—2)

This invention relates to measuring tapes and particularly to those of the type used for taking measurements of the body of a person for the purpose of making or fitting clothes.

The application is refiled for forfeited application Serial No. 273,843, filed May 16, 1939, for Measuring tape, and now abandoned.

In using flexible measuring tapes of the type now commonly employed for taking body measurements, the fitter holds the tape at the zero end, with one hand against the body of the person to be fitted and uses his other hand to obtain the required measurement.

Frequently, the person fitted is embarrassed by the contact of the fitter's hand. Furthermore, being compelled to hold the tape at its zero end, said end of the tape is concealed by the fitter and frequently is not properly arranged at the exact initial point of the length to be measured. Furthermore, when taking measurements under the arm of a person or at the crotch, the necessity for locating the zero end of the tape at a reentrant portion of the body not only causes embarrassment but frequently results in inaccurate measurements. In taking circumferential measurements as around the bust, neck, thigh, or other body parts, in view of the necessity of holding the zero end of the tape and thereby concealing it, such circumferential measurements are frequently inaccurate.

My invention therefore contemplates the provision of a tape provided with a projecting handle designed to be gripped by the user's hand and arranged preferably at the zero end of the tape, by means of which handle said zero end may be manipulated to bring it into corners or reentrant parts of the body, such as the arm or crotch, and thereby to arrange the zero point at the exact initial point of measurement without difficulty while maintaining said zero end of the tape completely visible.

My invention further contemplates the provision of a tape provided with means for manipulating the tape from a point spaced therefrom whereby the necessity for direct contact with any part of the body of the person to be fitted is entirely avoided.

My invention further contemplates the provision of a tape provided with a simple and inexpensive handle portion extending transversely of the tape preferably at the zero end thereof and preferably at right angles to the tape whereby the tape may be easily manipulated to obtain accurate measurements.

My invention further contemplates the provision of a tape handle provided with a space for the reception of an intermediate portion of the tape so that said tape may be used in taking circumferential measurements accurately and without the necessity for touching or concealing the zero end of the tape.

The various objects of the invention will be clear from the description which follows and from the drawings, in which, Fig. 1 is a perspective view of my new tape as it appears in use for taking both linear measurements as at the shoulder, or circumferential measurements as at the bust.

Fig. 2 is an elevational view of one form of my invention showing the handle made of wire.

Fig. 3 is a similar view of another modified form of the invention.

Fig. 4 is a front elevation partly in section of another modified form of the invention wherein rivets or other fastening means are dispensed with and a pencil or the like is utilized for the handle.

Fig. 5 is a perspective view of a modified form of the handle shown in Fig. 2, wherein the handle loop is in a different plane from the plane of the end loop for receiving an intermediate portion of the tape.

In the practical embodiment of the invention which I have shown by way of example, and referring particularly to Fig. 2, the tape 10 is provided with a metallic end member as 12 preferably of sheet metal, extending across the entire width of the tape and folded on itself to provide two thicknesses between which the end of the tape is secured. The folded edge 13 of the member 12 provides the zero edge of the tape. The folded thicknesses and the tape end are held by the rivet 14 or other suitable fastening member. Inserted between the thicknesses of the member 12 beyond the rivet and against the edge 13 is the upper end portion 16 of the handle 15. A depending member as 17 extends integrally from the portion 16, being joined thereto as by means of the bend 18 to provide a space 21 therebetween closed at its top by the bend 18, said space being designed for the reception of an intermediate portion of the tape when it is desired, for example, to take circumferential measurments. Extending from the portion 16 is the looped hand grip portion 19, the free end 20 of which may be welded to an adjacent part of said portion 19 or twisted thereabout in a manner which can be readily understood and need not be further described nor illustrated.

In use, as shown in Fig. 1, the zero edge 13 of the tape is arranged at the initial point of measurement as 22, the tape being manipulated by the hand grip portion 19 and the tape extended to the second point 23 to be measured, the measurement being read on the tape.

To use the tape to take circumferential measurements, the handle portion 19 is grasped by one hand of the fitter and the tape passed around the body, the intermediate portion 24 of the tape being inserted upwardly into the space 21 through the open lower end thereof and against the bend 18. The tape is then bent around the member 16 and the indication thereon adjacent the edge 13 is read giving the exact circumferential measurement without the necessity of concealing the zero end of the tape or of touching the body.

Referring to Fig. 3, I have there shown a wire handle 41, inserted through the looped end portion 42 of the tape 10, one extremity 43 of the handle being bent downwardly on to one face of the tape while the other extremity 44 is bent outwardly of the tape to provide the space 45 closed at its bottom. At its lower end, the part 44 is preferably bent inwardly toward the adjacent part of the handle as at 46, thereby closing the bottom of the space 45, the point 46 being welded, twisted or otherwise suitably secured to the handle. The looped end portion 42 of the tape may be secured, if desired, in any suitable manner as by the stitching 47.

Referring now to Fig. 4, I have there shown a simple means in the form of the hook 35 for holding the end of the tape, and for also forming a slot for the reception of an intermediate part of the tape, a pencil or the like 36 serving as a handle. The threaded lower end 37 of the hook is screwed into the pencil after being passed through the loop 28 of the tape, held by stitching as in Fig. 3. It will be understood that the hook part 29 is parallel to the zero edge and to the handle 36, there being a space 30 therebetween in to which an intermediate part of the tape may be brought when taking circumferential measurements. This form of the invention provides a simple, extremely inexpensive but efficient handle.

In Fig. 5, I have shown a somewhat modified form of the handle, similar, however, to the handle shown in Fig. 2. In this form of the invention, the end 25 of the handle is welded as at 26 to the remainder of the handle to form a loop 27 arranged in a plane at substantially right angles to the plane passing through the parts 16, 17, and 18. The handle may, therefore, be turned so that the part 17 is in front of the tape while the loop 27 remains in substantially the same general plane as the tape for easy manipulation.

It will be noted that in all the forms of the invention, a space is provided, which is closed at one end, for the reception of an intermediate portion of the tape when it is desired to take circumferential measurements and that the indication on said intermediate portion for the end of said measurement is that indication opposite the zero end of the tape, which zero end is readily visible.

It will further be seen that by providing a transversely extending handle on the tape, it becomes unnecessary for the user to touch any part of the body of the person to be measured but that the zero end is visible at all times and may be placed at exactly the right position as at the crotch, armpit, or other reentrant portions of the body without physical contact of the fingers of the user with the body and that accurate measurements may thereby be taken. The handle furthermore forms a convenient support by means of which the tape can be handled, hung up or on which it may be wound when not in use.

Consequently, it will be seen that I have provided a simple and efficient device for manipulating a tape well designed to meet the severe requirements of practical use.

While I have shown and described certain specific embodiments of my invention, I do not wish to be understood as limiting myself thereto but intend to claim the invention as broadly as may be permitted by the state of the prior art and the scope of the appended claims.

I claim:

1. In a handle for a measuring tape, a metal sheet of two thicknesses of material having an integral end fold and having parallel straight edges, a wire member having a straight part arranged between said thicknesses and at the fold, said straight part continuing transversely of the sheet past the fold a distance at least five times the width of the sheet and terminating at one end in a bend, a handle part extending from the bend on one side of the straight part and in contact therewith and with the sheet at its end, a second bend at the other end of the straight part immediately adjacent an edge of the sheet and extending to the other side of the straight part and a free end part extending from the second bend toward the first bend and in spaced relation to the straight part and providing a space therebetween of less width than the width of the sheet.

2. In a handle for a measuring tape, a metal sheet of two thicknesses of material having an integral end fold and having parallel straight edges, a wire member having a straight part between said thicknesses and arranged at the fold, said wire member having a bend of substantially 180° adjacent the fold at the end of the straight part and immediately adjacent an edge of the folded sheet, a free end part on the wire member substantially parallel to the straight part and spaced therefrom a distance less than the width of the folded sheet to provide a passage between the fold and said free end part guarded at the top and at both sides, and a hand grip portion on the straight part of the wire member extending perpendicularly to the edges of the folded sheet and having a length substantially greater than the width of said sheet and tape-securing means on the sheet, the hand grip portion and the hand of the user being in transverse spaced relation to the folded sheet when the handle is in use, and the fold of the sheet constituting a zero determining end edge movable into measuring position on movement of the hand grip portion in a direction perpendicular to its length.

3. A handle for a tape, said handle being of a single length of wire, a bend of more than 180° at one end part of the handle, a pair of continuous uninterrupted arms converging into contact with each other and adapted to fit into the hand of the user extending from the respective ends of the bend throughout the length of the handle except its other end part, each of said arms having a free end part terminating at substantially the same distance from the bend, the free end part of one arm being bent into transverse spaced relation to the free end part of the other arm to provide an elongated passage therebetween guarded at one end and both sides for the slidable passage therethrough of an intermediate part of a tape, and tape-holding means on the free end part of one of said arms.

4. In a measuring tape, a sheet doubled on itself to form a fold, a rivet passing through the sheet and adapted to pass through the tape to pivotally secure the sheet to the tape, with the fold at the zero end edge of the tape, a handle comprising a length of wire passing between the doubled parts of the sheet adjacent the fold, the longitudinal center line of said handle being parallel to and on one side of the fold, one end part of said length of wire being elongated and of sufficient extent to fit into and to be grasped by the hand of the user and being in length at least five times the width of the sheet, and a bent portion on the other end of said length, said bent portion being arranged on the other side of the fold and in outward spaced relation to the fold of the sheet a distance substantially equal to the width of said portion and providing a space therebetween closed at one end and at both sides for the reception of an intermediate portion of the tape when the handle is used for taking circumferential measurements, and said elongated end part when grasped by the hand being out of the way of the tape and out of contact with the person to be measured when the handle is used in taking crotch measurements and circumferential measurements.

5. In a handle for a measuring tape provided with a part folded back on itself and having a fold line at the zero end of the tape, a substantially straight member arranged between the thicknesses of the folded part and in permanent contact with and fixed against movement relatively to the fold of said part, a depending member substantially parallel to said straight member and spaced therefrom in the direction longitudinal of the tape a distance not substantially greater than the thickness of said depending member to form a tape receiving passage therebetween open at one end, said fold line being arranged in the passage, a connecting member integral with the straight member and the depending member and joining said members, said connecting member guarding one end of said passage, the tape being insertable into the passage through the open end of the passage by a movement in the direction substantially parallel to said straight member, and a hand grip member on the straight member at the folded part and extending substantially perpendicularly to the edges of the folded part of the tape throughout the length of said hand grip member and having a length sufficient to fit into and to extend across the palm of the hand, the straight member being adapted to be manipulated by the hand grip member into contact with the person to be measured while said hand grip member maintains the hand of the measurer out of contact with the person, and an intermediate portion of the tape being insertable into said passage and tensioned to read circumferential measurements on the tape immediately adjacent the edge of said folded part.

6. In a measuring tape having a part at the end thereof folded back on itself to provide a fold line at the zero end of the tape, a substantially U-shaped member of substantially uniform cross sectional size and shape throughout, having substantially parallel legs integrally connected by a connecting part arranged transversely of the legs, one of the legs passing between the thicknesses of the folded part at the end of the tape while the other leg is maintained by the connecting part in spaced relation to said one leg, and a hand grip portion on, substantially aligned with, and forming a continuation of, said one leg and of sufficient length to fit into the palm of the hand.

7. In a measuring tape having a part folded back on itself to provide a fold line at the zero end of the tape, an elongated handle having a zero determining portion thereon passing through the folded end part of the tape in the direction of the fold of said end part, said zero determining portion having an integral transversely arranged portion continuing in one direction past said fold and terminating in a depending portion parallel to said zero determining portion to form a substantially U-shaped member of substantially uniform cross sectional size and shape, the remainder of said handle extending in the same direction as said zero determining and depending portions, the distance between said portions being not substantially greater than the thickness of the respective portions.

8. In a handle for a measuring tape, a hook of a length of wire having a uniform circular cross sectional shape and size, said hook having substantially parallel legs spaced apart a distance substantially that of the diameter of the wire and having a bend in the wire extending between the legs, one of the legs being longer than the other and terminating in an elongated and relatively narrow handle extension extending generally in the same direction as the longer leg.

9. In a handle for a measuring tape according to claim 8 in which the tape is provided with an end part folded back on itself to form a fold of at least two thicknesses of material and a fold line at the zero end of the tape, the arrangement of the longer leg of the hook between the two thicknesses and passing completely through the fold.

10. In a handle for a measuring tape which is provided with an end part folded back on itself to form an end fold of at least two thicknesses of material at one end of the tape and a fold line at the zero end of the tape, a member of round wire having a first straight part arranged in the direction of the fold between said thicknesses and at the fold, said straight part continuing substantially in the direction of the fold line past the fold and terminating in an elongated and relatively narrow handle arranged in the same direction as the straight part, a second straight part substantially parallel to the first straight part and spaced therefrom a distance approximately that of the diameter of the wire, and a bend integral with and joining said straight parts and arranged transversely beyond the fold line.

11. In a handle for a measuring tape which is provided with an end part folded back on itself and secured to form an integral fold of at least two thicknesses of material and having a fold line at the zero end of the tape, a generally U-shaped length of round wire having a pair of parallel legs joined by an integral bend arranged transversely beyond and on one side of the fold line, one of said legs being longer than the other and being arranged between the thicknesses of said end part and extending past said thicknesses on the other side of the fold line, and an elongated and relatively narrow hand grip part secured to the longer leg on said other side of the fold line and extending in the same general direction as said longer leg.

12. A handle for a measuring tape according to claim 11 in which the hand grip part is of a separate piece from the wire and of approximately the size of a writing pencil, the end portion of the longer leg being fixedly inserted into an end portion of the hand grip part.

13. In a handle for a measuring tape which is folded back on itself and stitched to form a loop at its zero end part and a fold line at its zero end, a length of wire having a first straight part thereof passing through the loop, having a second part thereof parallel to the straight part and outside of the fold line and having a third part integrally joining the first straight part and the second part, and a handle at and extending from said first part in the same general direction as said first part.

GIUSEPPE F. PINSUTI.

REFERENCES CITED

The following references are of record in the file of this patent:

UNITED STATES PATENTS

| Number | Name | Date |
| --- | --- | --- |
| 991,103 | Titchell | May 2, 1911 |
| 1,001,142 | Hanrath | Aug. 22, 1911 |
| 1,011,628 | Klein | Dec. 12, 1911 |
| 1,186,853 | Smith | June 13, 1916 |
| 2,262,664 | Bresson | Nov. 11, 1941 |